United States Patent [19]
Erlichman

[11] 3,882,522
[45] May 6, 1975

[54] NON-COCKING SPRINGLESS SHUTTER DEVELOPING TWO PARAMETER EXPOSURE REGULATION

[75] Inventor: Irving Erlichman, Wayland, Mass.

[73] Assignee: Polaroid Corporation, Cambridge, Mass.

[22] Filed: May 22, 1973

[21] Appl. No.: 362,926

[52] U.S. Cl. .................. 354/30; 354/44; 354/48; 354/230; 354/247
[51] Int. Cl. ..................... G03b 7/08; G03b 9/08
[58] Field of Search ............ 354/40, 42, 43, 44, 48, 354/49, 270, 271, 60, 30, 26, 230, 234, 245, 246, 247, 248; 352/141

[56] References Cited
UNITED STATES PATENTS

| | | | |
|---|---|---|---|
| 2,388,609 | 11/1945 | Ericsson | 354/44 |
| 2,780,971 | 2/1957 | Fahlenberg | 354/50 |
| 2,906,187 | 9/1959 | Dotson et al. | 354/42 |
| 3,340,785 | 9/1967 | Adler et al. | 354/43 |
| 3,426,662 | 2/1969 | Levin | 354/43 |
| 3,427,941 | 2/1969 | Retzger | 354/42 |
| 3,518,927 | 7/1970 | Rehlity et al. | 354/60 X |
| 3,539,252 | 11/1970 | Gleason, Jr. | 354/271 X |
| 3,680,460 | 8/1972 | Starp | 354/230 |
| 3,709,137 | 1/1973 | Starp | 354/44 |
| 3,813,680 | 5/1974 | Wagensonner et al. | 354/44 |

*Primary Examiner*—Joseph F. Peters, Jr.
*Attorney, Agent, or Firm*—David R. Thornton

[57] ABSTRACT

An exposure mechanism and system for photographic apparatus characterized in the use of a stepper motor for supplying motive power to shutter blades and exposure mechanisms providing two parameter exposure control. The output of the stepper motor is substantially directly coupled with exposure mechanism blades to provide enhanced operational efficiencies. The mechanism is characterized by high accuracy due to close control of requisite anticipatory techniques occasioned with reversing exposure mechanism blade or element movement. The arrangement also results in reduced power consumption requirements for such mechanisms.

17 Claims, 10 Drawing Figures

FIG. 3

| PHASES ENERGIZED | RESULTANT ROTOR STEP POSITION | ROTOR DIRECTION |
|---|---|---|
| P,R | 1 | COUNTER CLOCKWISE ↓  CLOCKWISE ↑ |
| R,Q | 2 | |
| Q,S | 3 | |
| S,P | 4 | |

NON-COCKING SPRINGLESS SHUTTER DEVELOPING TWO PARAMETER EXPOSURE REGULATION

BACKGROUND OF THE INVENTION

Conventional shutter mechanisms are designed to utilize the advantageous characteristics of springs to derive both the opening and closing movement of shutter blades or light valving elements. Such springs provide both desirable consistency of dynamic performance as well as relatively high available energy. To operate the shutters, power is required and, in most applications, that power is delivered to the springs by an energy storing cocking procedure through a hand-driven device such as a crank lever or through a strong mechanical linkage connecting a film wind lever with the shutter.

With the advent of the miniature but fully automated camera, an need was developed for a shutter device which remained accurate while operating with relatively low power levels, i.e., the energy required for cocking stronger springs no longer was available. The design of a low power level shutter becomes even more complex where the device is called upon not only to automatically regulate an interval of exposure, but to provide a programmmed automatic dual parameter (exposure interval and aperture) control while functioning within the complex photographic cycle required of a fully automated single lens reflex form of camera.

As described in U.S. Pat. No. 3,714,879 by E. H. Land, I. Blinow and V. K. Eloranta, entitled "Reflex Camera", a photographic cycle involving such automated reflex operation requires that the shutter remain normally open, defining full aperture width for purposes of viewing and focusing. With the commencement of a photographic cycle, the shutter is required to fully close and remain closed while the optical path thereof converts to an exposure mode orientation. Following such conversions, the shutter is required to carry out two parameter exposure regulation, following which the shutter remains closed as the components of the camera are automatically driven to alter the optical path to its initial viewing-focusing mode orientation. When the latter conversion is completed, the shutter is called upon to reassume its open condition exhibiting maximum aperture width.

One shutter device which has been successfully operated within a fully automated camera incorporating such a cycle of operational events is described in U.S. Pat. No. 3,641,889. This shutter system utilizes a solenoid in conjunction with a relatively light spring system to block and unblock the optical path of the camera. The light valving or blade elements of the shutter move synchronously and in correspondence over the optical path through connection with a walking beam form of actuator. The walking beam is spring biased to urge the blades from a terminal position blocking the camera's optical path toward another terminal position fully unblocking the path. As the blades are moved toward the latter position, they cooperate to define a progressive variation of apertural values across the optical path. The plunger of the solenoid is coupled with the walking beam in a manner whereby the beam is rotated a direction causing the noted optical path blockage when the solenoid is energized. To operate with acceptable accuracy, for instance within about one-fourth of an F/stop, the shutter system is designed to accommodate for the dynamic inconsistencies necessarily present in such a mechanism. For instance, walking beam drive with the blade elements generates frictional off-axis torques, while the mass of the solenoid plunger, the walking beams and the shutter blades derive mass-accelerative effects which must be anticipated by the control system. In particular, the latter effects are witnessed at the "turnabout" point of any exposure in which the opening movement of shutter blade elements is reversed and the elements are driven into a closed orientation by the solenoid. Anticipation techniques as well as dynamic compensating techniques are utilized to derive shutter accuracy. One such corrective technique is described in a copending application for U.S. patent Ser. No. 333,341 entitled "Dynamically Compensated Exposure Control System" by C. C. Petersen, filed Feb. 16, 1973 and assigned in common herewith, which is a continuation of application Ser. No. 245,800, filed Apr. 21, 1972, now abandoned.

Where a fully automated control system is to be incorporated within a thin and compact housing suited for convenient transporting, several design limitations upon shutter design and control system components come to light. One design parameter paramount among the others resides in the presence of only a limited power supply. For instance, for the automatic camera described above, a power supply is available only as a thin battery having dimensions closely approximating that of a film unit formed within a cassette which is to be inserted within an exposure chamber. In view of such limited power availability, the shutter drive components of the camera as well as motorized processing and cocking devices therein are carefully coordinated to evolve a power demand profile which conserves as much energy as possible. Where further power demand reductions are available in the design of any of the components of such camera, advantage in reliability is to be realized.

SUMMARY OF THE INVENTION

The present invention is addressed to an exposure control system and apparatus therewithin which enjoys the capability of operating with high accuracy within compact cameras and, in particular, within such photographic devices as the thin, compact but fully automated single lens reflex camera described above. The accuracy of the exposure control system stems initially from the substantial elimination of those mechanical operations and related components which otherwise contribute to frictional and mass-accelerative effects encountered in prior systems. For instance, the apparatus of the invention utilizes no springs, requires no cocking and imparts movement to shutter or exposure mechanism blades or elements without developing acknowledgable off-axis torques. The drive component of the inventive system is a pulse driven stepper motor, the output of which is connected through a simple rack and pinion coupling directly to the light valving blades of an exposure mechanism.

Inasmuch as stepper motors are typically constructed having multiple stator phases in conjunction with a multiple pole rotor construction, the extent of their rotative drive output may be very accurately controlled to the extent that the anticipatory design requirements accommodating for overtravel encountered with the reversal of shutter blades is substantially reduced. Control over the extent of stepping of the motor drive of the shutter may be provided by digital circuitry. Accordingly, such shutter systems are readily incorporated within the complex photographic cycle of thin and compact fully automated photographic cameras.

A particular feature of the invention resides in the incorporation of a stepper motor driven exposure mechanism within a fully automated single lens reflex camera of thin and compact configuration. Because the stepper motor drive is de-energized at both a fully light blocking orientation of the mechanism blades as well as at a fully open orientation, the power demand profile of the entire camera may be improved. Such power demand improvement is of significance to the design of such cameras where battery power supplies are limited.

Another feature and object of the invention is to provide an exposure control apparatus of a variety including an exposure mechanism having light valving elements movable between terminal positions over an exposure aperture to regulate the passage of light along an optical path. This exposure mechanism element is connected in driving relationship with the output of a stepper motor. The stepper motor is energizable from a train of pulses to drive the exposure mechanism element between its terminal positions.

Another feature and object of the invention is to provide an exposure control system for photographic apparatus, the system comprising an exposure mechanism which is drivable from a closed terminal position to define progressively varying aperture values over an exposure aperture. The mechanism is movable in an opposite sense into the closed terminal position to terminate an exposure interval. The system further includes motor means, the output of which is connected in driving relationship with the exposure mechanism and this motor means is formed including a multi-stator element stepper motor energizable by a select sequence of electrical pulses to drive the output in correspondence with the number of those pulses. The system further includes a control arrangement connected in energizing relationship with the stepper motor. This control serves to selectively generate a predetermined sequence of the energizing pulses so as to energize the stepper motor in a manner wherein the exposure mechanism initially is driven to a select aperture defining orientation and subsequently is driven in an opposite sense into its closed terminal position.

The control system further features an arrangement wherein during the accelerative portion of the energization period of the stepper motor, a provision is made for anticipating any rotor lag of the stator. Further, the control system serves to incorporate a common delay selected to accommodate any velocity excursions above terminal velocity occasioned during the course of energization of the motor.

In one arrangement of the invention, exposure quality may be improved by increasing the stepping rate of the stepper motor drive during its energization to terminate an exposure. With such a feature, an exposure program may be devised which enjoys an improved capability for stopping and recording photographic subject action.

Other objects of the invention will in part be obvious and will in part appear hereinafter.

The invention accordingly comprises the apparatus and system possessing the construction, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION

Figure 1:
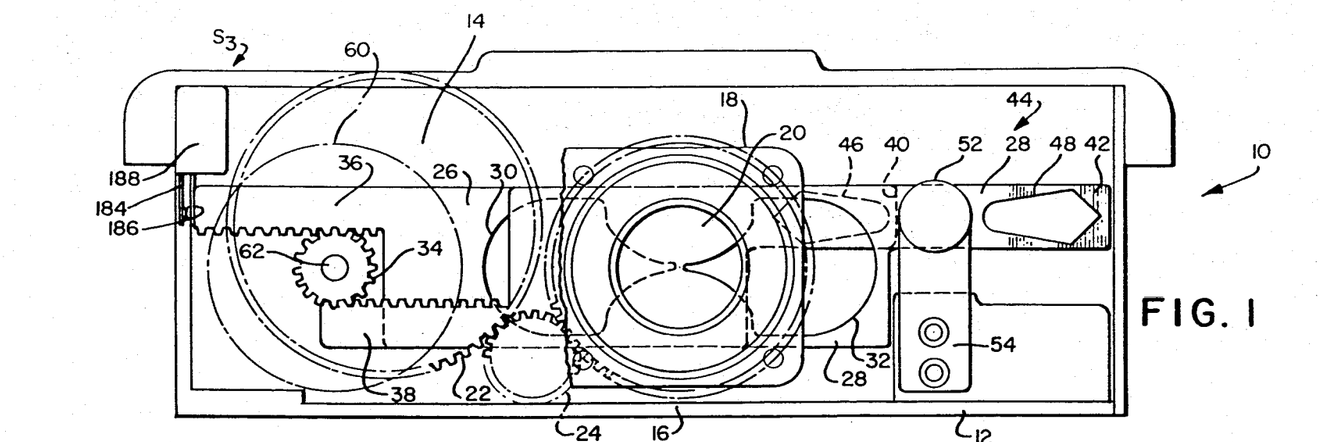
FIG. 1 is a front sectional view of the exposure control housing of a photographic camera incorporating the exposure control system of the instant invention.

Referring to FIG. 1, the general structure of an exposure housing suited for use, for instance, with the compact automatic single lens reflex camera described earlier is revealed at 10. Housing 10 is formed having a rear casting 12 serving as a principal support. More particularly, the center and one side portion of rear casting 12 serves to support a compound mounting fixture including an exposure mechanism mounting plate 14 which, in turn, supports a lens mounting bracket 16 at the center of housing 10. Bracket 16 serves to support an externally geared bezel 18 which is rotatable to focus the taking or objective lens 20 of the camera. Focusing movement of lens bezel 18 is provided from a hand-manipulated externally geared focusing wheel shown in outline form at 22. Focusing wheel 22 is interconnected with the geared periphery of bezel 18 through an idler gear 24.

The rearward portion of lens mounting bracket 16 also serves to support two coacting exposure mechanism or shutter elements or blades 26 and 28. Blades 26 and 28, respectively, are formed having tapered aperture openings 30 and 32 which symmetrically overlap about the center of taking lens 20 to define a variation of aperture values. The requisite mutual, synchronous and corresponding movement of blades 26 and 28 is realized by virtue of their mutual geared interconnection with a drive pinion 34. Note in this regard that blade 26 is formed having a rack extension 36, the gear teeth within which are meshed with those of pinion 34, while blade 28 has a rack extension 38, the gear teeth within which are meshed with pinion 34 on an opposite side thereof from extension 36.

The opposite sides of blades 26 and 28, respectively, are formed having extensions 40 and 42 designed to move within a light sensing station depicted generally at 44. Extensions 40 and 42, respectively, are formed having tapered secondary openings 46 and 48 which move in mutual symmetry to define a progressively enlarging secondary opening 50 (FIG. 2) before the light detecting elements of an exposure control circuit. Light sensing station 44 further includes an entrance optical assembly including a lens 52 having a field of view corresponding with taking lens 20 and a bracket 54 supporting lens 52. Bracket 54, in turn, is fixed to rear casting 12.

Figure 3:
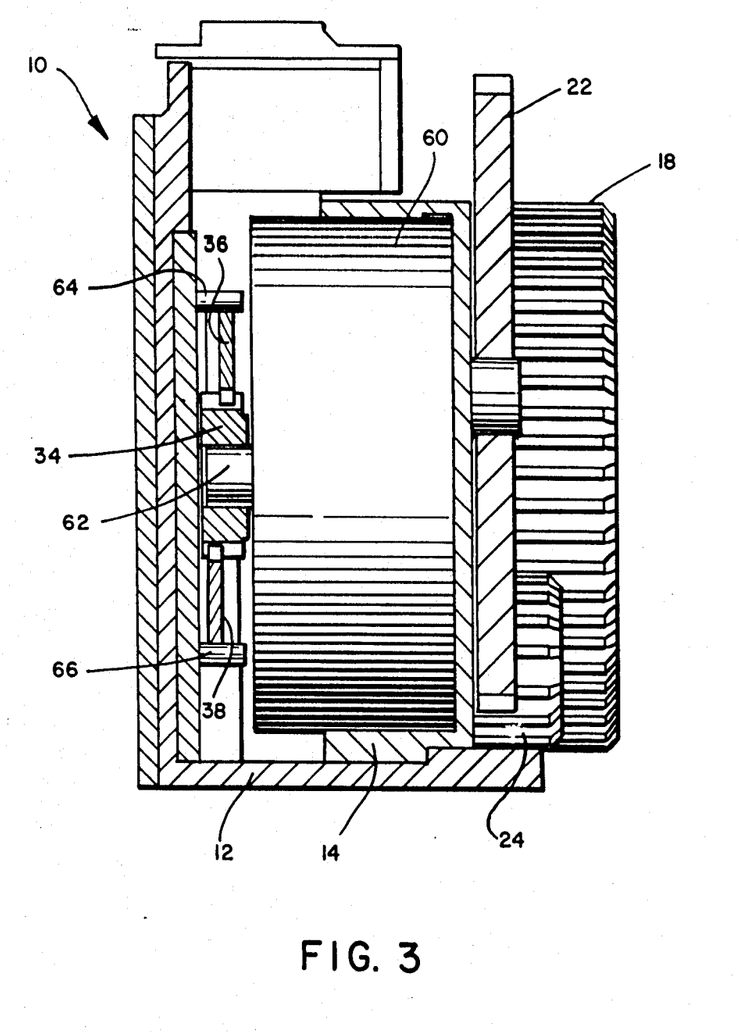
FIG. 3 is a partial side sectional view of the exposure housing of FIG. 1.

Rotational drive is imparted to the pinion 34 from a stepper motor 60, the output shaft 62 of which is journaled within pinion 34. As is shown in FIG. 3, motor 60 is of relatively thin dimension and is supported upon mounting plate 14 of the compound mounting fixture. To assure proper enmeshment between pinion 34 and rack extensions 36 and 38, guide pins 64 and 68 are provided and are shown extending from a rearward portion of bracket 14. As is apparent from the structure described, when motor 60 is selectively energized, it is capable of driving blades 26 and 28 from an orientation fully blocking the optical path toward open orientations such that openings 30 and 32 define a progressive variation of aperture valves until full aperture opening is reached. To define an interval of exposure, motor 60 is energized in one direction or sense until a sufficient exposure value has been reached, as determined from light sensing station 44, and then is energized in the opposite sense to reverse rotation of pinion 34 and reassume the closed or light blocking orientation shown in FIG. 1. It will be apparent that other selective energizations of motor 60 can be provided to secure the optical path of the apparatus where it is utilized for other applications, for instance, with single lens reflex cameras or the like. For the instant discussion, however, the operation of the inventive system as it operates to control an exposure is of primary importance. In this regard, note that the only moving elements connected to the drive of the device are a pinion 34 and two blades 26 and 28. Inasmuch as blades 26 and 28 may be fabricated from a light plastic material, their dynamic or inertial characteristics have minimal influence over the operation of the system. As a consequence, the amount of "overshoot" or overtravel which must otherwise be anticipated and provided for by design of the control system are greatly reduced and, for a significant portion of light brightness levels normally encountered in photography, may be substantially eliminated. Further in the same regard, it may be noted that drive forces imparted to blades 26 and 28 from pinion 34 are provided along vectors substantially parallel to their direction of motion. Accordingly, off-axis torques and other frictional deficiencies are substantially eliminated from the system at hand. The most significant aspect of the design leading to the avoidance of overtravel at the reversal of blades 26 and 28 stems from the particular selection of a stepper-type motor at 60.

Figure 4:
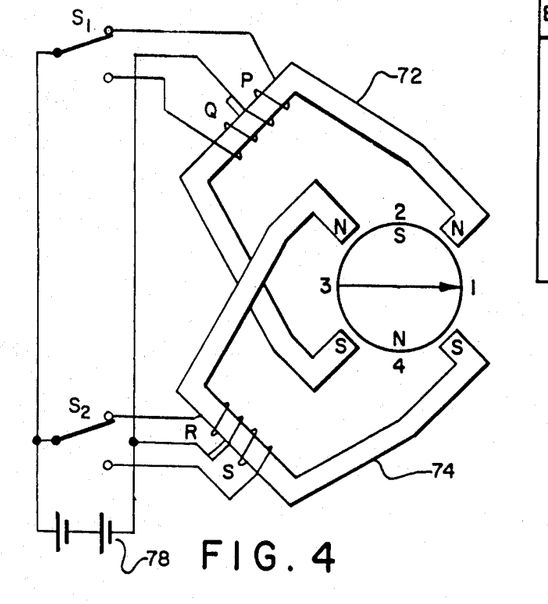
FIG. 4 is a simplified diagrammatic view of a four-phase two-pole stepper motor.
Figure 5:
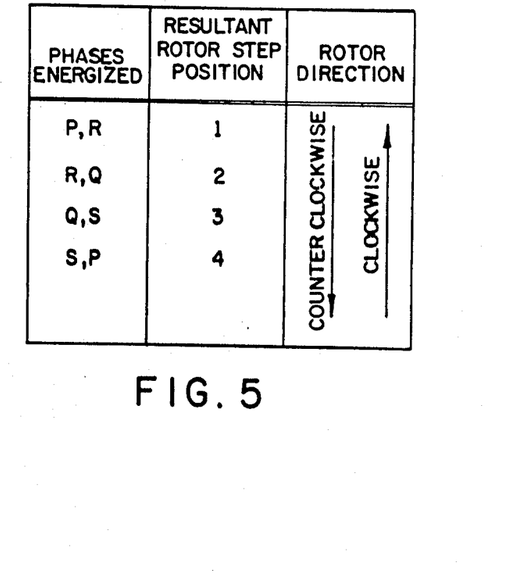
FIG. 5 is a tabulation of switching logic for operating the stepper motor of FIG. 4.

Looking momentarily to FIGS. 4 and 5, a permanent magnet pulse stepper motor is portrayed in schematic or simplified fashion. Such motors as at 60 may assume a variety of designs, depending upon the step angle, torque and speed desired. For the instant application, a step angle of about 7½° has ben found adequate. The motor schematically portrayed in FIG. 4 describes the mode of operation of a four-phase stepper motor having two bifilar wound stators 72 and 74. The bifilar winding permits four stator phases as depicted at P and Q on stator 72 and at R and S on stator 74. For applications as shown at 60, the rotor would be designed having a multiplicity of poles, for instance 12, however, for facilitating the instant description, the rotor at 76 is depicted as a two-pole magnet. Energization of the windings of stators 72 and 74 is provided by a battery 78 and switching between phases is depicted by mechanical-type switches $S_1$ and $S_2$.

Looking additionally to FIG. 5, starting in the position depicted in FIG. 4, should switch $S_1$ be transferred from contact with the P phase to the Q phase, the magnetic field developed in stator PQ would be reversed. The resultant change in magnetic field causes rotor 76 to move 90° counterclockwise from the position denoted at 1 to the position shown at 2. Switching switch $S_2$ from contact with the R phase winding to the S phase winding would cause another 90° counterclockwise step of rotor 76 to the position labeled 3. Transferring switch $S_1$ back to contact with the P phase winding will cause another counterclockwise 90° step, while bringing switch $S_2$ back to its original position contact with the phase R winding will return rotor 76 to its original starting position 1. Reversing the sequence of the above-described switching, starting with switch $S_2$, then actuating switch $S_1$ provides for clockwise stepping movement. Generally, to achieve a 7° 30 minute step angle for a four-phase stepper motor, a rotor having 24 poles is necessitated. From the foregoing, it may be apparent that, as rotor 76 stepped from position to position by appropriate switching or by pulse train and directional logic control, it moves between what may be described as magnetic detents. Accordingly, when the rotor is commanded to stop and then reverse, tha halting point is precisely reached. In effect, the system of the invention serves to provide a "controlled reverse" of the blades 26 and 28 of the exposure apparatus of the invention. The "overshoot" otherwise encountered in the necessary dynamics of other drive devices, for instance, tractive electromagnetic units or the like, is substantially eliminated in the instant drive system. As a consequence, desired accuracy and resolution of exposure value are achieved.

Figure 2:
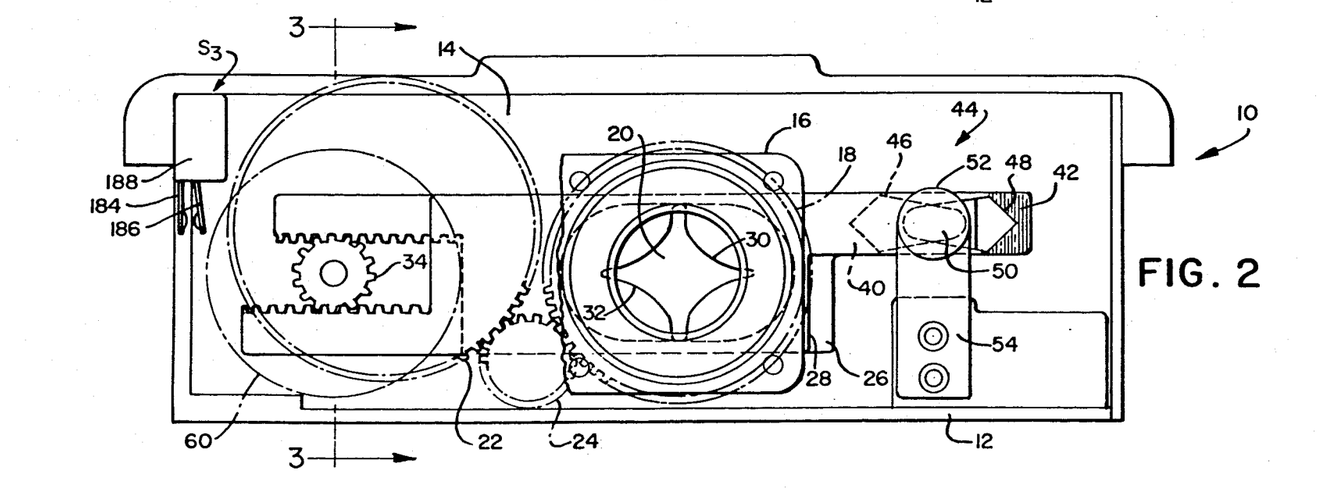
FIG. 2 is another view of the exposure housing of FIG. 1 showing the components thereof as they are oriented during another portion of a photographic cycle.
Figure 7:
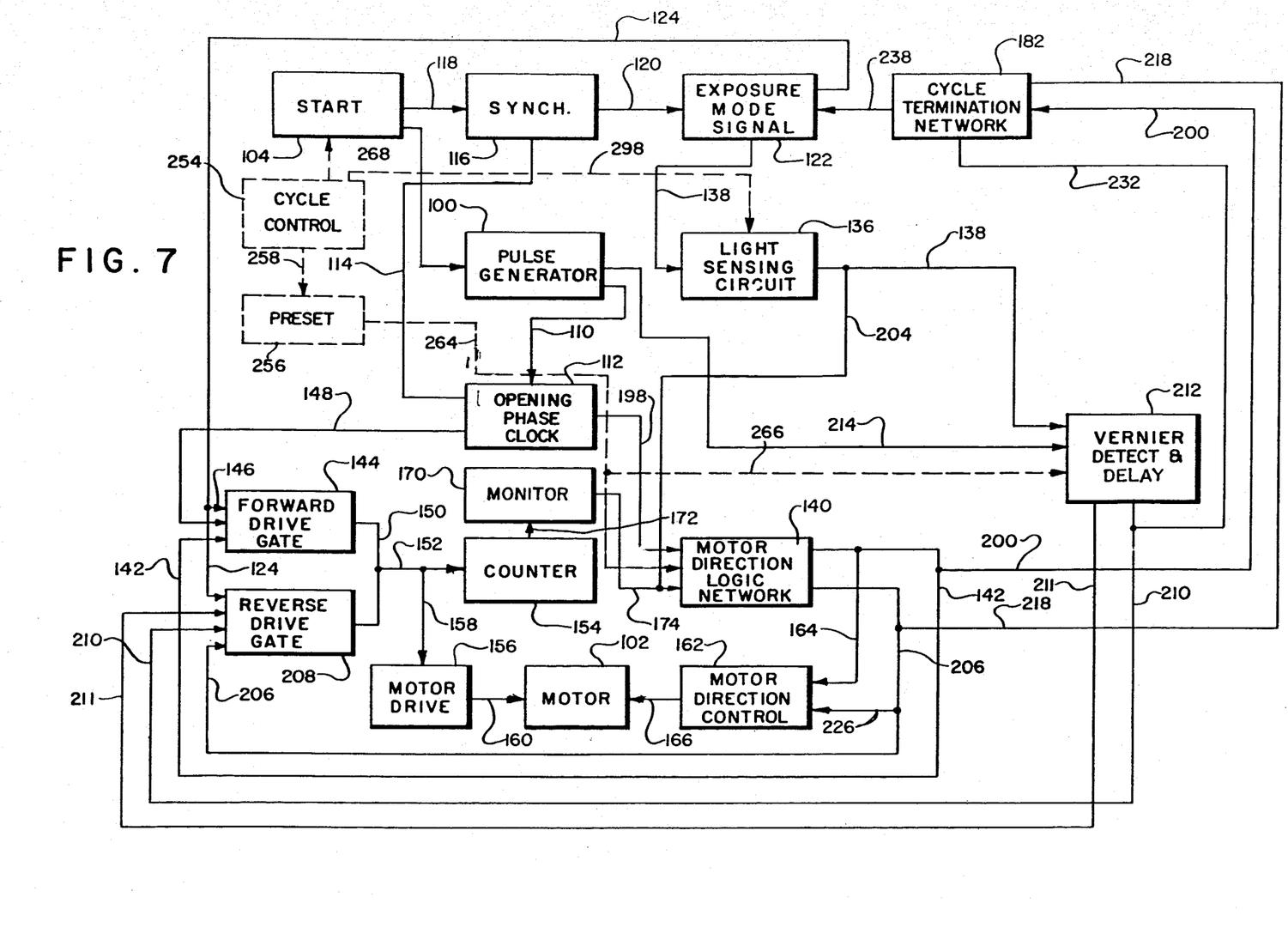
FIG. 7 is a schematic representation of a drive circuit for operating the exposure control apparatus of the invention.
Figure 8:
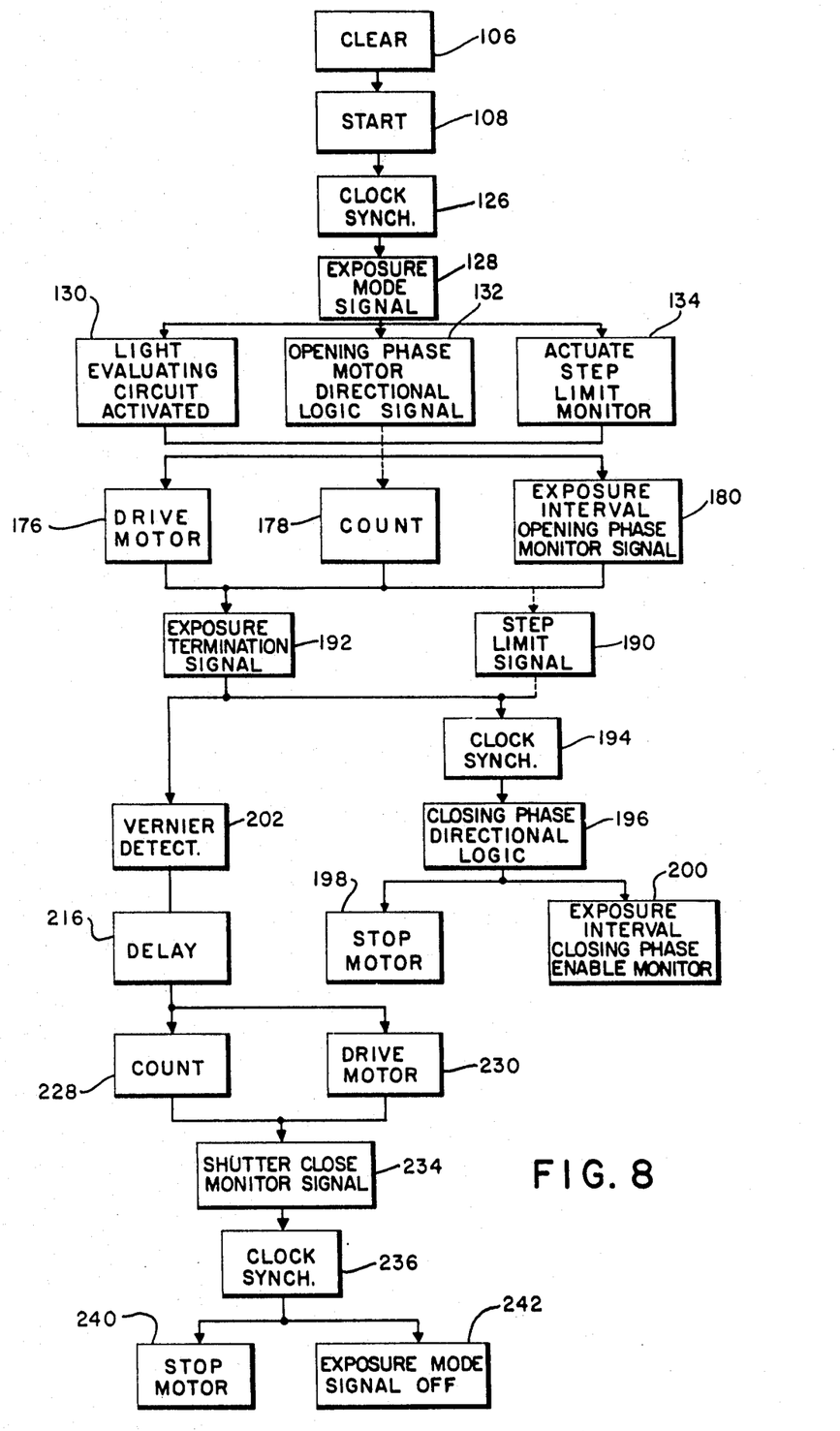
FIG. 8 is a flow chart elaborating upon the operational logic of FIG. 7.

Looking to FIGS. 7 and 8, a control system for operating the exposure mechanism of FIGS. 1 and 2 is illustrated. This circuit is described in greater detail in a co-pending application for U.S. patent by R. C. Kee, Ser. No. 362,664 filed concurrently herewith, entitled "Exposure Control System for Photographic Apparatus" and assigned in common herewith. The control circuit utilizes a pulse train input from a pulse generator as denoted at 100 in combination with exposure controlling level logic signals to provide appropriate forward and reverse drive to stepper motor 60, now denoted by block 102. As noted earlier, the exposure control system of the invention may be utilized in conjunction with a variety of photographic cycles. For instance, in the cycle of an automatic single lens reflex camera, the start-up of exposure control may commence at an intermediate event within such cycle. Accordingly, the starting logic input to the circuit of FIG. 7 is represented by a functional block 104. As shown in FIG. 8, prior to activating start function 104, the digital logic components of such circuit preferably are cleared or reset as depicted at function block 106. Following such clearing, the start command is received at block 104 as indicated by event block 108 in FIG. 8.

Upon receipt of such command at block 108, starting circuit 104 activates the entire circuit including pulse generator 100. Generator 100 produces a pulse train at output line 110. The frequency of pulse generation at line 110 is selected to develop an optimum pulse width and spacing for driving motor 102 at a step rate representing an optimum sub-multiple thereof. This division is provided by a "divide by" circuit or opening phase clock subcircuit as depicted at block 112. The resultant pulse train output is referred to as the "opening phase clock" input to the circuit and is introduced, inter alia, along line 114 to a clock synchronization circuit shown at block 116.

Synchronization circuit 116 also receives a start signal along line 118 from start network 104. These signals are synchronized, for instance by "anding" and are introduced along line 120 to a level logic network depicted by block 122 which, in turn, derives a logic level signal at line 124 representing that an exposure interval is properly commenced and the exposure mode portion of any given photographic cycle is underway. This synchronization of the clock pulse train with the start command and subsequent evolution of the exposure mode signal are shown, respectively, at blocks 126 and 128 in FIG. 8. As additionally is shown in that figure, in response to the generation of the exposure mode signal, a light evaluating circuit is activated in preparation for exposure mechanism blade movement as shown at block 130. The control circuit develops a signal commanding motor 102 to rotate, when pulsed, in a direction providing for the opening of blades 26 and 28 (FIGS. 1 and 2) as shown at block 132 and a network serving to determine when that number of pulses are received by the motor which represent the maximum opening of blades 26 and 28 is enabled as shown at block 134.

Looking to FIG. 7, it may be seen that a light sensing circuit 136 is activated by exposure mode signal generating network, 122 from along line 138. Circuit 136 may assume a variety of configurations, for instance that described in U.S. Pat. No. 3,620,143 by J. P. Burgarella. The latter circuit utilizes a photodetecting element in combination with an integrating capacitor and amplification stage to develop a signal, the rate of buildup of which depends upon scene brightness and which is introduced to a trigger or comparitor network. When the signal level reaches a predetermined value, the trigger network alters the level of its output state to command the termination of an exposure interval. This output command is presented at line 138.

A motor directional logic signal providing for forward or aperture opening motor drive is generated by logic network 140. This opening logic signal is developed by aligning the network during the initial clearing or resetting portion of a photographic cycle. The forward drive signal produced by network 140 is introduced along line 142 to one input terminal of a forward drive gate shown at 144. Forward drive gate 144 additionally receives an input from exposure mode signal 124 at line 146 and is coupled to opening phase clock 112 through line 148. When the condition sense of exposure mode signal output 124 as well as directional logic network 140 at line 142 are appropriate, gate 144 permits the passage of the motor energizing clock pulse train present at line 148 and, accordingly, the train is introduced from lines 150 and 152 to a counter 154 as well as to a motor drive circuit 156 from along line 158. Circuit 156 introduces the pulse train along line 160 to motor 102. Prior to this, motor direction logic network 140 will have signaled a motor direction control circuit 162 from along line 164 to cause motor 102 to operate in a direction causing blades 26 and 28 to move to commence an exposure. The interconnection between motor directional control circuit 162 and motor 102 is depicted at line 166.

Inasmuch as a predetermined number of steps or pulses will cause blades 26 and 28 to reach a terminal position defining maximum available aperture, it is preferred that motor 102 (60) be de-energized when that terminal position is reached. Accordingly, counter 154 records or responds to the number of steps introduced to the motor, for instance 20 and when that step representing the attainment of a terminal position is reached, a monitor circuit 170, coupled with counter 154 through line 172, develops an appropriate logic level signal at line 174. When that appropriate level signal is reached, a corresponding reversing signal is developed at motor direction logic network 140, the signal otherwise presented along line 142 to gate 144 being removed.

Turning again to FIG. 8, it may be seen that the operation of driving the motor 102 is depicted at block 176, the counting operation is shown at block 178, and an exposure interval opening phase monitor signal is developed as shown at block 180. The latter signal is generated through the operation of a switch $S_3$ operating in conjunction with the components of a cycle termination network depicted in FIG. 7 at block 182.

Looking to FIGS. 1 and 2, it may be seen that switch $S_3$ is formed having two resilient contact leaves 184 and 186 which extend from and are supported by an insulative base 188. Leaf 186 is normally biased out of contact with leaf 184. Base 188, in turn, is fixed to rear casting 12 of housing 10. As shown in FIG. 1, when exposure mechanism blades 26 and 28 block the optical path of the device, switch $S_3$ is closed. However, when blades 26 and 28 commence to move to define an interval of exposure, leaves 184 and 186 open to provide a signal that an exposure interval is in an opening as opposed to closing phase. No insulative cap is shown affixed to leaf 186 of switch $S_3$ inasmuch as blade 26 preferably is formed of a plastic material opaque to actinic radiation.

The arrest of opening movement of blades 26 and 28 takes place in consequence of either of two operational events, the reaching of an open terminal position or the receipt of an exposure termination signal prior to the attainment of maximum aperture opening. Returning to FIG. 8, it may be seen that the counting function at block 178 will monitor the number of steps, for instance twenty, required to achieve maximum opening. If this maximum opening is reached prior to receipt of an exposure termination signal, a step limit signal is generated as depicted by function block 190. The development of an exposure termination signal is shown by block 192. Assuming that the step limit signal as shown at 190 is generated, such signal is then synchronized with the clock pulse train, as depicted at block 194, and the resultant synchronized signal is utilized to derive a directional logic for causing the motor 102 to operate in the reverse sense. As shown at blocks 198 and 200, this closing phase directional logic signal also serves to stop motor 102 and to derive a signal representing that the exposure interval will now enter a closing phase.

Referring to FIG. 7, it may be seen that the output of the step limit monitor 170 at line 174 is introduced to motor direction logic network 140 to provide for the stopping of motor 102 as well as for deriving a reversing signal. Additionally, the clock train pulses from clock circuit 112 are introduced to network 140 from along line 198. These inputs are anded to provide the noted synchronization function. The signal providing for the enabling of cycle termination network 182 is derived at network 140 and inserted into network 182 through line 200.

Returning to FIG. 8, when an exposure termination signal is generated as at 192, its presence is detected utilizing a vernier detection technique as shown at block 202. This technique is desirable particularly where full aperture opening is not achieved inasmuch as the exposure termination signal most probably will occur within the interval of a step or clock drive pulse. By breaking this pulse down through the use of even multiples of the frequency thereof, a more precise arrangement for sensing the presence of a signal at 192 may be devised.

Looking to FIG. 7, it may be noted that light sensing circuit 136 provides one output at line 204 which is introduced to motor direction logic network 140. This signal is synchronized with the clock pulse train entering network 140 from line 198 and the resultant output of network 140 at line 206 is introduced to one input terminal of a reverse drive gate 208. Another input to gate 208 is provided from exposure mode signal network 122 as introduced from line 124. The final input to gate 208 is provided from line 210 which, in turn, leads to the output of a vernier detect and delay circuit as shown at 212. The vernier detection function therein operates in conjunction with the signal output from light sensing circuit 136 as introduced from line 138 and the higher frequency pulse train at line 214 which is derived from the pulse generator of the system at 100. By synchronizing the pulse generator frequency with the light sensing signal, a detection technique is provided which may have, for instance, a resolution of one-fourth of the interval of a motor energizing clock pulse. By responding to the detection at the multiple frequency of generator 100, and redividing the pulse generator frequency, an energizing pulse train at the clock frequency is redeveloped. However, this subsequent energizing pulse train now is readjusted in time to more accurately regulate exposure. Where about twenty steps or excitation pulses are utilized for driving motor 102 to an extent providing movement of blades 26 and 28 between terminal positions, it is found that a detecting technique wherein a given clock pulse is separated into four detecting intervals, an accuracy with an average resolution of about one-twelfth f/stop can be realized. As is apparent, such detector selection requires an appropriate initial selection of pulse generator frequency with respect to the frequency of the clock driving pulses. In practice, a pulse generator frequency representing a multiple of four of the clock frequency has been found desirable. Such control represents a considerable improvement over conventional automatic systems.

As shown at event block 216 in FIG. 8, a delay is purposely imposed at this point in time. This delay is derived at network 212 through the use of an additional divider stage, the output of which responds to an initial divider circuit clock pulse to evolve an output signal delayed an amount equivalent to one clock pulse interval. This pulse is present at line 211 and is introduced to reverse drive gate 208. Inasmuch as drive gate 208 will not pass a readjusted energizing pulse train at line 210 until such time as the signal at line 211 is present, the delay of one pulse width is realized. In effect, about a 1–1½ ms. delay is achieved with the arrangement. The motor direction logic output at line 206 also is introduced along line 218 to cycle termination network 182 to provide one input representing that an optical path blocking phase of exposure interval is underway. This input is described in conjunction with block 200 of FIG. 8.

Figure 6:
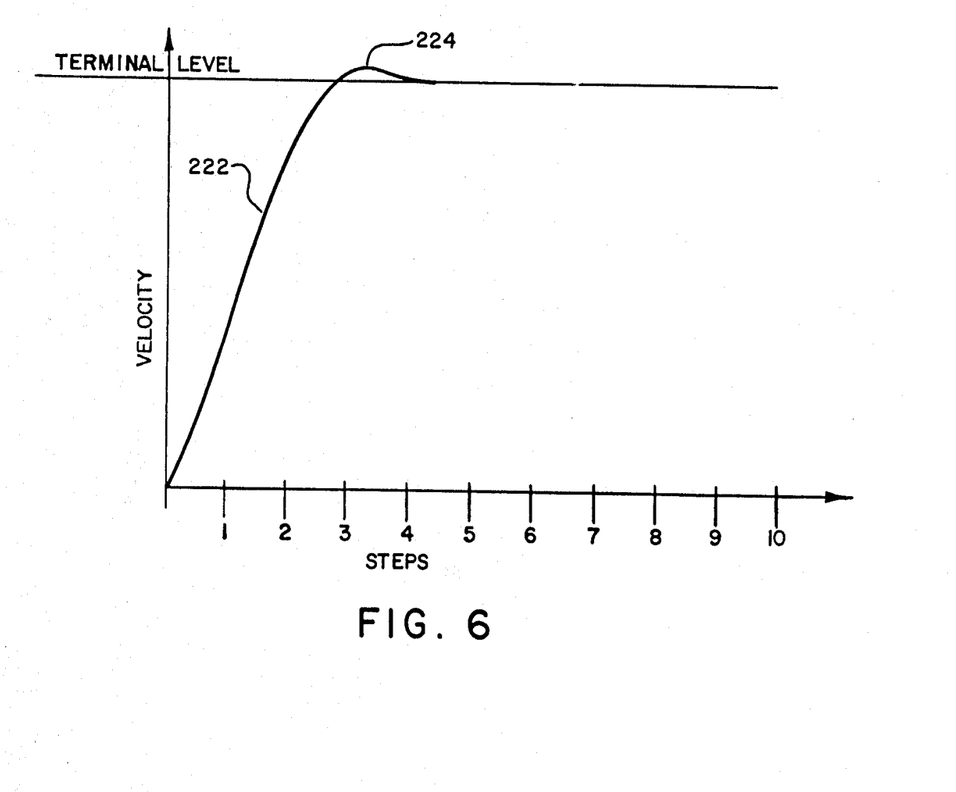
FIG. 6 is a performance curve for a typical stepper motor relating velocity with stepping pulses.

Looking momentarily to FIG. 6, one purpose of the noted 1–1½ ms. delay may be revealed in the graph showing motor output velocity as it relates to the sequence of steps through which the motor progresses during initial drive. The resultant curves as at 222 shows that terminal level velocity is achieved very rapidly, for instance within about 2–3 steps. However, the velocity of the motor momentarily may extend above terminal level velocity for a period of time representing about a millisecond. To assure proper motor operation, it is desirable that a delay be inserted within the control system to assure a synchronization between the clock pulses received and motor position. Accordingly, the delay as described at block 216 in FIG. 8 is provided. Returning to that figure, it may be seen that when appropriate input signals are present at reverse drive gate 208 and a reversing signal from logic network 140 is inserted within motor directional control network 162 from line 226, motor 102 will be driven from motor drive network 156 and its direction of rotation will be appropriately controlled through line 166 from motor direction control network 162. In consequence, exposure mechanism blades 26 and 28 are driven toward their closed or terminal light blocking orientations.

As illustrated respectively at event function blocks 228 and 230 of FIG. 8, counter 154 and monitor 170 operate, as before, during the period of reverse drive of motor 102. Should blades 26 and 28 be driven from their fully opened position, monitor 170 will serve to count the maximum number of steps, for instance twenty, required to achieve full closure and, when such number of steps have been monitored, insert a signal along line 174 to logic network 140. Additionally, as the blocking terminal position is reached, extension 36 of blade 26 will again urge leaf 186 into contact with leaf 184 of switch $S_3$ (FIG. 1). The resultant signal is admitted within cycle termination network 182. Network 182 also monitors the blade reversing clock pulses at line 210 from along line 232 and synchronizes the two signals. These two operations are depicted in FIG. 8 at blocks 234 and 236. The synchronized signal is then introduced along line 238 to exposure mode signal network 122. As a consequence, the exposure mode signal level at line 124 is altered to prohibit the passage of clock or energizing drive pulses at line 210 through reverse drive gate 208. As described at event blocks 240 and 242, motor 102 is stopped and the circuit is shut down in consequence of the alteration of the signal at line 124.

As an additional feature of the instant invention, it may be noted that the clock pulses providing for the stepping of motor 102 during the optical path blocking phase of an exposure interval are derived from vernier detect network 212. Accordingly, the reversing drive pulse train at line 210 may be selectively generated at a higher frequency. This higher frequency will provide for a more rapid shutter closure thereby affording greater latitude to the selection of the exposure control program of the control system.

As noted earlier, the instant stepper motor driven exposure mechanism is ideally suited for operation within the complex cycle of a fully automated single lens reflex camera. Such cameras are called to secure an exposure chamber by closing a shutter during two intervals within a photographic cycle wherein the optical path components thereof are altered between viewing and exposure orientations. Additionally, where automatic processing of an exposed film unit is carried out, the exposure chamber is maintained in the noted secured condition. Where the power supplies for such cameras are limited, any form of energy conservation, particularly at the shutter drive, is recognized as being important to system design. Typical of the compact single lens reflex cameras with which such energy conservation is concerned is one described in U.S. Pat. No. 3,714,879, while the optical path alterations required of such cameras are described in U.S. Pat. No. 3,672,281. The criticality of maintaining a low current demand profile from camera contained battery supplies and the like is described in connection with a copending application for U.S. patent by C. H. Biber and E. K. Shenk entitled "Photographic Apparatus With Solenoid Powered Instrumentalities", Ser. No. 163,948, filed July 19, 1971, now U.S. Pat. No. 3,791,278, and assigned in common herewith.

Figure 9:
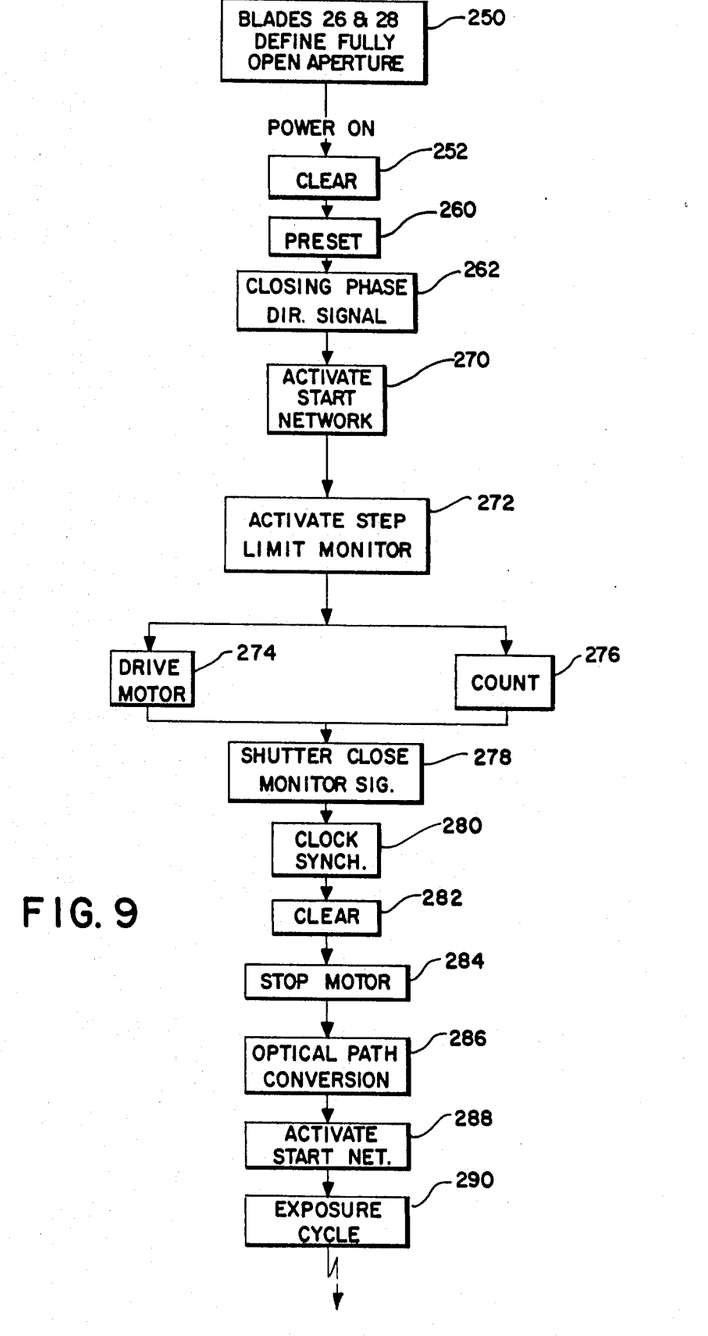
FIGS. 9 and 9A comprise a flow chart illustrating an operation of the circuit of FIG. 7 for single lens reflex camera apparatus, FIG. 9A being an extension of FIG. 9.

Looking to FIG. 9, a flow chart showing a modification of the circuit of FIG. 7 wherein the circuit is operated in conjunction with a single lens reflex photographic cycle is displayed. At the commencement of any such cycle, exposure mechanism blades 26 and 28 (FIG. 1) are fully open to define an aperture of maximum width. This viewing-focusing condition is represented at operational function block 250. Following viewing and focusing, the operator actuates an appropriate switch to apply power to the circuit, whereupon the clearing function described in connection with block 106 of FIG. 8 is carried out. This clearing feature is represented at operational event block 252. As shown additionally in FIG. 7, for complex photographic cycle operation, a cycle control function is incorporated within the camera and is shown in phantom at 254. Following the carrying out of a clearing function, cycle control 254 activates a preset function or network 256 from along input line 258. This preset function is depicted in FIG. 9 at block 260 and serves to generate a closing phase directional signal as shown at block 262. The generation of this closing phase directional signal is represented in FIG. 7 as being carried out by a signal induced through line 264 to motor directional logic network 140. Simultaneously, this signal is introduced from line 264 along line 266 to vernier detect and delay function 212. Accordingly, function or network 212 is utilized for the generation of closing phase clock or drive energization pulses for introduction to motor 102. This operation is discussed in FIG. 8 in connection with block 230. Following the activation of preset network 256, cycle control 254, operating through line 268, activates start network 104 as shown in FIG. 9 at block 270. Upon such activation of start network 104, step limit monitor including monitor 170 and counter 154 are activated as depicted at operational event block 272 in FIG. 9. The circuit continues in closing phase exposure mode sequence wherein drive motor 102 is energized through reverse drive gate 208 and the delivered pulses are counted at counter 154. These operations are depicted in FIG. 9 respectively at blocks 274 and 276.

As the extension 36 of shutter blade 26 reaches the orientation shown in FIG. 1, wherein contact is made between resilient contact leads 186 and 184 of switch S₃, a shutter close monitor signal is developed as depicted at operational event block 278. This signal is synchronized with the clock pulse train as shown at operational event block 280 and described earlier in connection with cycle termination network 182 in FIG. 7 and event block 236 in FIG. 8. Cycle control 254 then causes the carrying out of a clearing function as shown in operational event block 282, following which motor 102 is stopped as shown at block 284. At this point, no power demands are made by motor 102 and the energy or power supply of the camera is allocated to the powering of mode conversion functions, for instance, optical path conversion as represented at operational event block 286 in FIG. 9. When such conversion has been carried out, cycle control 254 again activates starting network 104 as represented at operational block 288. The control circuit then carries out an exposure interval as described in conjunction with FIG. 8. Carrying out of this exposure cycle is represented by operational event block 290 in FIG. 9.

As described earlier, exposure cycle 290 terminates with the full closure of exposure mechanism blades 26 and 28. Again at this point, motor 102 is fully shutdown and makes no current demands upon the power supply of the camera. Accordingly, energy conservation is realized again at this point in the photographic cycle. Optical path conversion is carried out by cycle control function 254 as depicted at operational event block 292 in FIG. 9A. Following this conversion, cycle control 254 causes the activation of a clearing function as described earlier and represented at block 294.

Figure 9A:
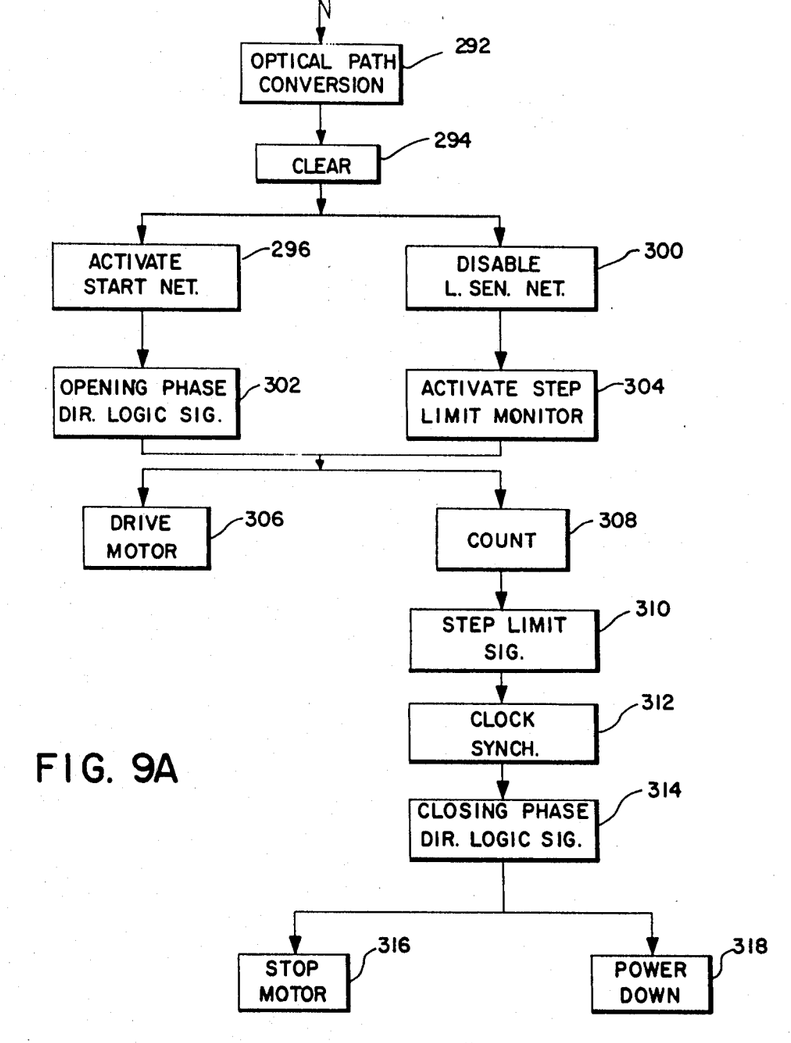

Following the clearing or resetting operation wherein all logic elements of the circuit are realigned, cycle control 254, operating through line 268, activated starting network 104, as represented in FIG. 9A at block 296. Simultaneously, control network 254, acting along line 298, disables or short-circuits light sensing circuit 136. As a consequence, no exposure terminating signal will be available at lines 138 and 204. The output of motor directional logic network 140 remains in its prealigned condition providing an opening or forward drive input at gate 144. This input is represented in FIG. 9A at block 302. Simultaneously, the monitor feature of the circuit is activated as shown at block 304, counter 154 being enabled. Under the logic conditions imposed upon the circuit of FIG. 7, the clock or drive pulse train is generated from opening phase clock 112 and is introduced through drive gate 144. Motor 102 is driven in a sense causing blades 26 and 28 to open, as represented at operational event block 306 in FIG. 9A, while the number of pulses passed to motor 102 is recorded at counter 154 as represented at event block 308 in FIG. 9A.

As blades 26 and 28 reach their fully open positions, monitor 170 will evolve a step limit signal, as represented in FIG. 9A at block 310. This signal corresponds with that described in connection with block 190 of FIG. 8. The signal is synchronized, as shown at operational event block 312 and discussed earlier in connection with block 194 of FIG. 8. As disclosed in that figure at block 200, a closing phase directional logic signal is generated at network 140. This signal generation is shown in FIG. 9A at block 314. The generation of this signal causes forward drive gate 144 to interrupt the passage of energizing clock or drive pulses to motor drive 156.

As the delivery of forward drive clock pulses to motor drive 156 is interrupted, motor 102 is stopped, as represented in FIG. 9A at block 316, and cycle control 254 operates to shut down the control system of the camera as represented at block 318.

It may be observed from the above description that the stepper motor driven exposure mechanism is ideally suited to operation within complex photographic cycles. in particular, inasmuch as the motor is de-energized during select conditions of full aperture opening as well as at conditions where the optical path of the camera is blocked for securing the exposure chamber thereof, significant advantage in minimizing energy consumption may be realized.

Since certain changes may be made in the abovedescribed system and apparatus without departing from the scope of the invention herein involved, it is intended that all matter contained in the description thereof and as shown in the accompanying drawings shall be interpreted as illustrative and not in a limiting sense.

What is claimed is:

1. A photographic exposure control system for a camera, the camera having means for mounting photographic film material at a given focal plane, a lens for directing image-carrying rays from a scene along a given optical path to the camera focal plane, and selectively operable means for initiating an exposure cycle, said system comprising:

means for sensing the brightness of the scene;

a magnetically detented stepper motor having an output drive pinion, said motor being energizable by a select sequence of electrical pulses to rotate said output drive pinion in a step relation therewith;

a pair of blade members mounted for displacement with respect to each other between a first position blocking the optical path and other positions unblocking the path and defining an aperture valve through which scene light rays are passed to the camera focal plane, each of said blade members having a primary and secondary opening which when displaced into at least partial coincidence with the corresponding opening of the other blade member respectively define a primary aperture value unblocking the given optical path and a secondary aperture value unblocking said brightness sensing means, each of said blade members having rack extension portions coupled in mutually oppositely meshed relation with said motor drive pinion so that said blade members are simultaneously moveable in opposite directions in accordance with motor operation in a given direction to define progressively changing primary and secondary aperture values;

means responsive to the exposure initiating means for generating a first predetermined sequence of electrical pulses to selectively energize said motor in a first directional sense to displace said blades from said first position to unblock the optical path to define progressively enlarging primary aperture values thereby initiating an exposure interval during which scene light is directed to the focal plane and, in response to said brightness sensing means, for subsequently generating a second predetermined sequence of electrical pulses to selectively energize said motor in an opposite directional sense to displace said blades back to said first position thereby terminating the exposure interval.

2. A photographic exposure control system for a photographic camera configured for scene viewing through the taking lens, the camera having means including a displaceably mounted mirror for directing image-carrying light rays from the scene along a common optical path and then alternately alone either a view path or an exposure path for viewing and film exposure operations respectively, and selectively operable means for initiating an exposure cycle, said exposure cycle initiating means including means for controlling said mirror to change from said view path to said exposure path and back again to said view path, said exposure system comprising:

a magnetically detented stepper motor having a rotatable output member, said motor being energizable by a select sequence of electrical pulses to rotate said output member in a step relation therewith;

shutter means for blocking and unblocking the optical path and for defining an aperture value through which scene light rays pass along the common optical path, said shutter means including blade means mounted for displacement between a first terminal position blocking the common optical path and a second terminal position unblocking the common path, said blade means defining increasing aperture values during displacement between said first and second terminal positions, said blade means being coupled to said output member and displaceable between said first and said second terminal positions in accordance with rotation thereof, and said blade means being normally in said second terminal position for camera storage and scene viewing purposes;

means responsive to the exposure cycle initiating means for generating a first sequence of electrical pulses to selectively energize said motor in one directional sense to display said blade member from said second to said first terminal position to block the common optical path prior to changing from said viewing operation to said exposure operation, for subsequently generatinga second predetermined sequence of electrical pulses to selectively energize generating a motor in a respectively opposite directional sense to unblock the common optical paht so as to initiate an exposure interval during which scene light is directed to the focal plane, for thereafter generating a third predetermined sequence of electrical pulses to again selectively energize said motor in said one directional sense to displace said blades back to said first terminal position to again block the common optical path so as to terminate the exposure interval, and for finally generating a fourth predetermined sequence of electrical pulses to selectively energize said motor in said opposite directional sense to displace said blade means back to said second terminal position for scene viewing purposes.

3. The system of claim 2 additionally including means responsive to displacement of said blade means to said second terminal position for terminating the energization of said motor in said opposite directional sense so as to minimize power consumption when said blade means is in said second terminal position.

4. The system of claim 2 wherein a predetermined number of pulses is required for displacing said blade means from said first terminal position to said second terminal position, and said terminating means includes counter means for providing an output signal responsive to said generator producing said predetermined number of pulses in said first directional sense and means responsive to said signal for terminating the flow of pulses to said motor.

5. A photographic exposure control system for a camera, the camera having means for mounting photographic film material at a given focal plane, a lens for directing image-carrying rays from a scene along a given optical path to the camera focal plane, and selectively operable means for initiating an exposure cycle, said system comprising:
- a magnetically detented stepper motor having a moveable output drive member, said motor being energizable by a select sequence of electrical pulses to move said output member in a step relation therewith;
- blade means;
- means for mounting said blade means for displacement between a first terminal position and a second terminal position, said blade means providing changing aperture values through which scene light may pass to the focal plane as said blade means are displaced between said terminal positions, said blade means being coupled to said output drive member and configured for movement therewith;
- means responsive to the exposure cycle initiating means for generating a sequence of pulses to energize said motor in a first directional sense to displace said blade means toward said second terminal position to define a maximum aperture thereat; and
- means responsive to the generation of a sufficient number of said sequence of pulses sufficient to displace said blade means to its said second terminal position for terminating the energization of said motor to minimize power consumption when said blade means is in its said second terminal position.

6. The system of claim 5 wherein a predetermined number of pulses is required for displacing said blade means from said first to said second terminal position and said terminating means includes counter means for providing an output signal responsive to said generator producing said predetermined number of pulses in said first directional sense and means responsive to said signal for interrupting the flow of pulses to said motor.

7. A photographic exposure control system for a camera, the camera having means for mounting photographic film material at a given focal plane, a lens for directing image-carrying rays from a scene along a given optical path to the camera focal plane, and selectively operable means for initiating an exposure cycle, said system comprising:
- means for evaluating the scene being photographed;
- a magnetically detented stepper motor having a moveable output drive, said motor being energizable by a select sequence of electrical pulses to move said output drive in a step relation therewith;
- blade means;
- means for mounting said blade means for displacement between one terminal position blocking passage of light along the optical path and another terminal position wherein it defines an aperture valve through which scene light may pass to the focal plane, said blade means defining progressively changing aperture values as said blade means are displaced from said first terminal position, said blade means being coupled to said output drive member and configured for movement therewith;
- means responsive to the exposure initiating means for generating a first predetermined sequence of electrical pulses to selectively energize said motor in a first directional sense to displace said blade means from said one terminal position to define progressively changing aperture values thereby initiating an exposure interval during which scene light is directed to the focal plane and, in response to said scene evaluating means, for subsequently generating a second predetermined sequence of electrical pulses to selectively energize said motor in an opposite directional sense to displace said blade means back to said one terminal position thereby terminating the exposure interval, and means for delaying the energization of said motor by said second predetermined sequence of pulses to continue synchronization between said pulses and said motor step relation when said motor is energized in said opposite directional sense.

8. The system of claim 7 wherein said generating means includes a clock network providing a train of pulses of given pulse length and said delay is substantially equal to said given pulse length.

9. The system of claim 7 wherein said delay is in the range 1 to 1½ milliseconds.

10. A photographic exposure control system for a camera, the camera having means for mounting photographic film material at a given focal plane, a lens for directing image-carrying rays from a scene along a given optical path to the camera focal plane, and selectively operable means for initiating an exposure cycle, said system comprising:
- a magnetically detented stepper motor having a moveable output drive member, said motor being energizable by a select sequence of electrical pulses to move said output member in a step relation therewith;
- blade means;
- means for mounting said blade means for displacement between one terminal position wherein it will preclude passage of scene light along the given optical path and at least another position wherein it defines an aperture value through which scene light may pass to the focal plane, said blade means being coupled to said output drive member and configured for movement therewith; and
- means responsive to the exposure initiating means for generating a sequence of electrical pulses at a first average frequency to selectively energize said motor in a first directional sense effecting the displacement of said blade means at a first average rate from said one position to initiate the opening phase of an exposure interval during which scene light is directed to the focal plane and, in correlation with an evaluation of the scene being photographed, for subsequently generating a sequence of electrical pulses at a second average frequency to selectively energize said motor a second average rate in an opposite directional sense effecting the displacement of said blade means back to said one position thereby defining the closing phase of the exposure interval.

11. The system of claim 10 wherein said second frequency is substantially faster than said first frequency so as to define a faster closing than opening phase.

12. A photographic exposure control system for a camera, the camera having means for mounting photographic material at a given focal plane, means for directing imagecarrying rays from a scene along a given optical path to the camera focal plane, and selectively operable means for initiating an exposure cycle, said system comprising:

a magnetically detented stepper motor having a moveable output member, said motor being energizable by a select sequence of electrical pulses to move said output member in a step relation therewith;

blade means;

means for mounting said blade means for displacement between a position blocking the optical path and another position unblocking the optical path, said blade means providing changing aperture values through which scene light may pass to the focal plane as said blade means are displaced from said blocking position, said blade means being coupled to said output member and configured for movement therewith; and means responsive to the exposure initiating means for generating a first predetermined sequence of electrical pulses to selectively energize said motor in a first directional sense to displace said blade means from said blocking position toward said other position to initiate an exposure interval during which scene light is directed to the focal plane and for then generating a second predetermined sequence of electrical pulses to selectively energize said motor in an opposite directional sense to displace said blade means back to said blocking position thereby terminating the exposure interval.

13. The system of claim 12 wherein said stepper motor output member includes a drive pinion, said blade means includes a pair of blade members, each of said blade members having an opening therein configured when displaced into at least partial coincidence with the opening of the other blade member for defining an aperture value unblocking the optical path, and each of said blade members having a rack extension coupled in mutually oppositely meshed relation with said motor drive pinion so that said blade members are simultaneously moveable in opposite directions in accordance with motor operation to define changing aperture values.

14. A method of controlling operation of a photographic shutter arrangement to expose photographic film material comprising the steps of:

evaluating the brightness of a scene to be photographed;

generating a series of electrical pulses corresponding to a desired exposure interval correlated to said evaluation;

feeding said series of electrical pulses to a magnetically detented stepper motor to energize said motor in step with said pulses;

driving a photographic shutter arrangement from said magnetically detented stepper motor in a correlated step relation therewith to define the total amount of scene light impinging on said photographic film in accordance with said evaluation, said driving step including driving said shutter arrangement from said magnetically detented stepper motor to initiate and terminate said exposure interval.

15. The method of claim 14 wherein said series of pulses is generated as said shutter is actuated.

16. The method of claim 14 wherein said utilizing step includes applying said pulses in a first sequence to drive said motor in a first directional sense so as to actuate said shutter arrangement to define progressively enlarging apertures and then applying said pulses in a second sequence to drive said motor in an opposite directional sense to define progressively decreasing aperture values.

17. A photographic exposure control system for a camera, the camera having means for mounting photographic material at a given focal plane, means for directing imagecarrying rays from a scene along a given optical path to the camera focal plane, and selectively operable means for initiating an exposure cycle, said system comprising:

a magnetically detented stepper motor having a moveable output member, said motor being energizable by a select sequence of electrical pulses to move said output member in a step relation therewith;

blade means;

means for mounting said blade means for displacement between a position blocking the optical path and another position unblocking the optical path, said blade means providing changing aperture values through which scene light may pass to the focal plane as said blade means are displaced from said blocking position, said other position defining the maximum said aperture value, said blade means being coupled to said output member of said magnetically detented stepper motor and configured for movement therewith; and means responsive to the exposure initiating means for generating a sequence of electrical pulses to selectively energize said magnetically detented stepper motor to initiate an exposure interval related to scene brightness during which scene light is directed to the focal plane and to displace said blade means from said blocking position toward said other position, and for then generating a sequence of electrical pulses to selectively energize said magnetically detented stepper motor to effect a further displacement of said blade means to cause said blade means to again preclude scene light from passing to the focal plane thereby terminating said exposure interval.

* * * * *